United States Patent
Nawa et al.

[11] Patent Number: 5,863,850
[45] Date of Patent: Jan. 26, 1999

[54] PROCESS OF MAKING ZIRCONIA BASED CERAMIC MATERIAL

[75] Inventors: Masahiro Nawa, Katano; Shoichi Nakamoto, Neyagawa; Keiichi Yamasaki, Nara; Koichi Niihara; Atsushi Nakahira, both of Suita; Tohru Sekino, Toyonaka, all of Japan

[73] Assignee: Matsushita Electric Works, Ltd., Osaka, Japan

[21] Appl. No.: 863,297

[22] Filed: May 27, 1997

Related U.S. Application Data

[62] Division of Ser. No. 544,285, Oct. 17, 1995, Pat. No. 5,728,636.

[30] Foreign Application Priority Data

Sep. 21, 1995 [JP] Japan ................................. 7-269334

[51] Int. Cl.⁶ .................................................. C04B 35/119
[52] U.S. Cl. .......................................... 501/105; 501/103
[58] Field of Search ..................................... 501/105, 103

[56] References Cited

U.S. PATENT DOCUMENTS

| | | |
|---|---|---|
| 4,626,518 | 12/1986 | Watanabe et al. . |
| 4,690,911 | 9/1987 | Nakada . |
| 4,748,138 | 5/1988 | Watanabe et al. . |
| 4,753,902 | 6/1988 | Ketcham . |
| 4,851,293 | 7/1989 | Egerton et al. . |
| 5,061,665 | 10/1991 | Seki et al. . |
| 5,130,210 | 7/1992 | Iwasaki et al. . |
| 5,206,192 | 4/1993 | Dransfield et al. . |
| 5,525,560 | 6/1996 | Yamazaki et al. . |

FOREIGN PATENT DOCUMENTS

| | | |
|---|---|---|
| 58-032066 | 2/1983 | Japan . |
| 63-144167 | 6/1988 | Japan . |
| 6-47029 | 2/1989 | Japan . |
| 5246760 | 9/1993 | Japan . |

OTHER PUBLICATIONS

*Journal of the European Ceramic Society*, vol. 10 (1992), pp. 381–392.

German Search Report, no translation.

Levin et al., *Phase Diagrams for Ceramists*, p. 143.

Radford et al., "Zirconia Electrolyte Cells," *J. Mat. Sci.*, vol. 14, pp. 59–65.

*Primary Examiner*—Karl Group
*Attorney, Agent, or Firm*—Burns, Doane, Swecker & Mathis, L.L.P.; William A. Knoeller

[57] ABSTRACT

A zirconia based ceramic material having improved and well-balanced mechanical strength and toughness consists essentially of 0.5 to 50 vol % of $Al_2O_3$ having an average grain size of 2 μm or less and the balance of a partially stabilized zirconia having an average grain size of 5 μm or less. The partially stabilized zirconia consists essentially of 8 to 12 mol % of $CeO_2$, 0.05 to 4 mol % of $TiO_2$ and the balance of $ZrO_2$. Fine $Al_2O_3$ grains having an average grain size of 1 μm or less are dispersed within the grains of the partially stabilized zirconia at a dispersion ratio. The dispersion ratio is defined as a ratio of the number of $Al_2O_3$ grains dispersed within the grains of the partially stabilized zirconia relative to the number of the entire $Al_2O_3$ grains dispersed in the ceramic material, and at least 2% in the present invention. The ceramic material can be made by the following process. A first constituent formed of the partially stabilized zirconia is mixed with a second constituent formed of $Al_2O_3$ to obtain a mixture. The mixture is molded into a desired shape, and then sintered in the air under an atmospheric pressure to obtain the ceramic material.

16 Claims, 1 Drawing Sheet

PROCESS OF MAKING ZIRCONIA BASED CERAMIC MATERIAL

This application is a divisional, of application Ser. No. 08/544,285, filed on Oct. 17, 1995 now U.S. Pat. No. 5,728,636.

BACKGROUND OF THE INVENTION

1. Field of the Invention

The present invention is directed to a zirconia based ceramic material having excellent mechanical strength and toughness, and also a process of making the same product.

2. Disclosure of the Prior Art

A partially stabilized zirconia, which is obtained by the addition of a preferable amount of a stabilizer such as yttrium oxide ($Y_2O_3$), cerium oxide ($CeO_2$), magnesium oxide (MgO), or the like., to zirconia ($ZrO_2$), has been well known as a ceramic material having higher mechanical strength and toughness than another popular ceramic materials such as alumina ($Al_2O_3$), silicon carbide (SiC), silicon nitride ($Si_3N_4$), or the like. The partially stabilized zirconia possesses a unique mechanism for improving the mechanical strength and toughness. That is, a phase transformation from metastable tetragonal zirconia to stable monoclinic zirconia is caused under a stress concentration, for example, at the tip of a crack developed in the partially stabilized zirconia. Since such a transformation, which is usually called as a stress induced phase transformation, is accompanied with a volume expansion of about 4%, a further progress of the crack in the partially stabilized zirconia can be effectively prevented. For example, a partially stabilized zirconia containing $Y_2O_3$ as the stabilizer exhibits a mechanical strength of 1000 MPa or more. Particularly, it is already known that a ceramic material comprising $Al_2O_3$ grains as a dispersing phase and the partially stabilized zirconia containing $Y_2O_3$ as a matrix exhibits a higher mechanical strength of 2400 to 3000 MPa. However, these ceramic materials provide a relatively low mechanical toughness which is in a range of 5 to 6 MPa $m^{1/2}$ and not always enough to use as structural and machine parts. On the other hand, a partially stabilized zirconia containing $CeO_2$ as the stabilizer exhibits a high mechanical toughness of 10 to 20 MPa $m^{1/2}$. Additionally, the partially stabilized zirconia containing $CeO_2$ is capable of stably maintaining the metastable tetragonal zirconia at a temperature range of 200° C. to 400° C., and particularly keeping the mechanical strength even under a hydrothermal condition. The partially stabilized zirconia containing $Y_2O_3$ exhibits a low temperature degradation of mechanical strength at the temperature range of 200° C. to 400° C. When the partially stabilized zirconia containing $Y_2O_3$ is kept at the temperature range for an extended time period, most of tetragonal zirconia included in the partially stabilized zirconia containing $Y_2O_3$ is transformed to monoclinic zirconia accompanying with the volume expansion of about 4%. By the volume expansion, micro cracks are developed in the partially stabilized zirconia containing $Y_2O_3$, so that the mechanical strength is decreased. In addition, the tetragonal-to monoclinic phase transformation is accelerated under the hydrothermal condition, so that the mechanical strength is considerably decreased. Thus, the partially stabilized zirconia containing $CeO_2$ exhibits a higher mechanical strength than the partially stabilized zirconia containing $Y_2O_3$ at the above temperature range, and particularly under the hydrothermal condition. However, the mechanical strength of the partially stabilized zirconia containing $CeO_2$ is in a range of 600 to 800 MPa at a room temperature, which is lower than that of the partially stabilized zirconia containing $Y_2O_3$. Therefore, by improving mechanical strength of the partially stabilized zirconia containing $CeO_2$, more expanded application fields will be expected as a material overcoming the low temperature degradation of the mechanical strength of the widely-used partially stabilized zirconia containing $Y_2O_3$. In other words, a zirconia based ceramic material having improved and well-balanced mechanical strength and toughness is desired.

Japanese Early Patent Publication [KOKAI] No. 5-246760 discloses a zirconia based composite material comprising a matrix of a partially stabilized zirconia containing 5 to 30 mol % of $CeO_2$ and a secondary phase of at least one selected from $Al_2O_3$, SiC, $Si_3N_4$, $B_4C$, carbides, nitrides and borides of elements of groups IVa, Va, VIa of the periodic table. Fine grains of the secondary phase are dispersed within grains as well as in grain boundaries of the partially stabilized zirconia matrix. When the content of $CeO_2$ is more than 30 mol %, the mechanical strength of the composite material is lowered due to the increase of cubic zirconia in the matrix. When the content of $CeO_2$ is less than 5 mol %, a formation of metastable tetragonal zirconia in the matrix is not enough. The composite material contains 0.5 to 50 vol % and more preferably 2.5 to 30 vol % of the secondary phase.

Japanese Early Patent Publication [KOKAI] No. 63-144167 discloses the following ceramic materials (a) to (c):

(a) a ceramic material comprising 45–94.75 mol % of $ZrO_2$, 5–45 mol % of $TiO_2$ and 0.25–10 mol % of a rare earth oxide selected from the group consisting of $Gd_2O_3$, $Yb_2O_3$, $Nd_2O_3$, $Tb_2O_3$, $Pr_2O_3$, $Dy_2O_3$, $Ho_2O_3$, $Sm_2O_3$, and $Er_2O_3$;

(b) a ceramic material comprising 48–94.75 mol % of $ZrO_2$, 5–45 mol % of $TiO_2$ and 0.25–7 mol % of $Y_2O_3$;

(c) a ceramic material comprising 35–93.5 mol % of $ZrO_2$, 5–45 mol % of $TiO_2$ and 1.5–20 mol % of $CeO_2$.

For example, in the ceramic material (a), a grain growth of tetragonal zirconia is prevented by adding a small amount of the rare earth oxide to a partially stabilized zirconia containing $TiO_2$ as the stabilizer, so that the mechanical properties are improved. In addition, this prior art discloses that grains of cubic zirconia and/or zirconium titanate ($ZrTiO_4$) are effective to prevent the grain growth of tetragonal zirconia. These ceramic materials (a) to (c) can be used as a dispersing phase to reinforce a ceramic matrix such as alumina, mullite, or the like. For example, a ceramic composite consisting of about 5 vol % of the ceramic material and the balance of the ceramic matrix may be useful as a material improving mechanical properties of the ceramic matrix.

Japanese Patent Publication [KOKOKU] No. 64-7029 discloses a ceramic material comprising 61 to 87 wt % of $ZrO_2$, 11 to 27 wt % of $CeO_2$ and 20 wt % or less of $Al_2O_3$. The ceramic material mainly contains tetragonal zirconia, in which $CeO_2$ forms a solid solution with $ZrO_2$. 20% or less of the entire zirconia crystals in the ceramic material is monoclinic zirconia and/or cubic zirconia. This prior art discloses that a sintered body produced by preparing a mixture of $ZrO_2$, $CeO_2$ and $Al_2O_3$ with the above composition and sintering the mixture exhibits a mechanical strength comparable to a sintered body in $ZrO_2$-$Y_2O_3$ system. This prior art also indicates that the ceramic material may contains 2 wt % or less of $SiO_2$, $TiO_2$ and $Fe_2O_3$, etc., as impurities. That is, since a $ZrO_2$ powder used in this prior art is prepared by treating a zircon sand containing the impurities with an acid to obtain an acid chloride of zirconium, and performing a heat-treatment to the acid chloride, there is a probability of remaining a small amount of the impurities in the $ZrO_2$ powder. On the other hand, when the content of $Al_2O_3$ is more than 20 wt %, a sintering temperature of the ceramic material is raised, so that the grain growth of the zirconia crystals is enhanced. By such a grain growth, variations in mechanical strength of the ceramic material are increased.

Thus, various attempts have been made to improve the mechanical properties of the zirconia based ceramic material.

SUMMARY OF THE INVENTION

A primary object of the present invention is to provide a zirconia based ceramic material having improved and well-balanced mechanical strength and toughness. That is, the zirconia based ceramic material consists essentially of 0.5 to 50 vol % of $Al_2O_3$ grains having an average grain size of 2 μm or less and the balance of grains of a partially stabilized zirconia having an average grain size of 5 μm or less. The partially stabilized zirconia consists essentially of 8 to 12 mol % of $CeO_2$, 0.05 to 4 mol % of $TiO_2$ and the balance of $ZrO_2$. $Al_2O_3$ grains having an average grain size of 1 μm or less are dispersed within the grains of the partially stabilized zirconia at a dispersion ratio. The dispersion ratio is defined as a ratio of the number of $Al_2O_3$ grains dispersed within the grains of the partially stabilized zirconia relative to the number of the entire $Al_2O_3$ grains dispersed in the ceramic material, and at least 2%.

In a preferred embodiment of the present invention, at least 90 vol % of the partially stabilized zirconia is tetragonal zirconia.

A further object of the present invention is to provide a process of making the zirconia based ceramic material. That is, a first constituent formed of the partially stabilized zirconia consisting essentially of 8 to 12 mol % of $CeO_2$, 0.05 to 4 mol % of $TiO_2$ and the balance of $ZrO_2$ is mixed with a second constituent formed of $Al_2O_3$ such that the ceramic material essentially consists of 0.5 to 50 vol % of $Al_2O_3$ and the balance of the partially stabilized zirconia. A resultant mixture is molded into a desired shape to form a green compact thereof. The green compact is sintered in an oxidizing atmosphere under an atmospheric pressure to obtain the ceramic material.

It is preferred that after the sintering step, a hot isostatic pressing (HIP) treatment is performed to the ceramic material in an oxygen containing atmosphere to reach a higher relative density of the ceramic material.

In a preferred embodiment of the present invention, a powder of the partially stabilized zirconia as the first constituent can be prepared by the sub-steps of mixing a first aqueous solution of a zirconium salt with a second aqueous solution including cerium and titanium salts, hydrolyzing the mixed solution with an alkali aqueous solution to obtain a precipitate, drying and heating the precipitate to obtain a calcined powder, and pulverizing the calcined powder. On the other hand, a powder of α-$Al_2O_3$ having an average grain size of 0.5 μm or less or a powder of γ-$Al_2O_3$ having a specific surface area of 100 $m^2/g$ or more can be used as the second constituent.

These and still other objects and advantages features of the present invention will become more apparent from the following description and examples of the present invention when taken in conjunction with the attached drawing.

DETAIL DESCRIPTION OF THE INVENTION

Figure 1:
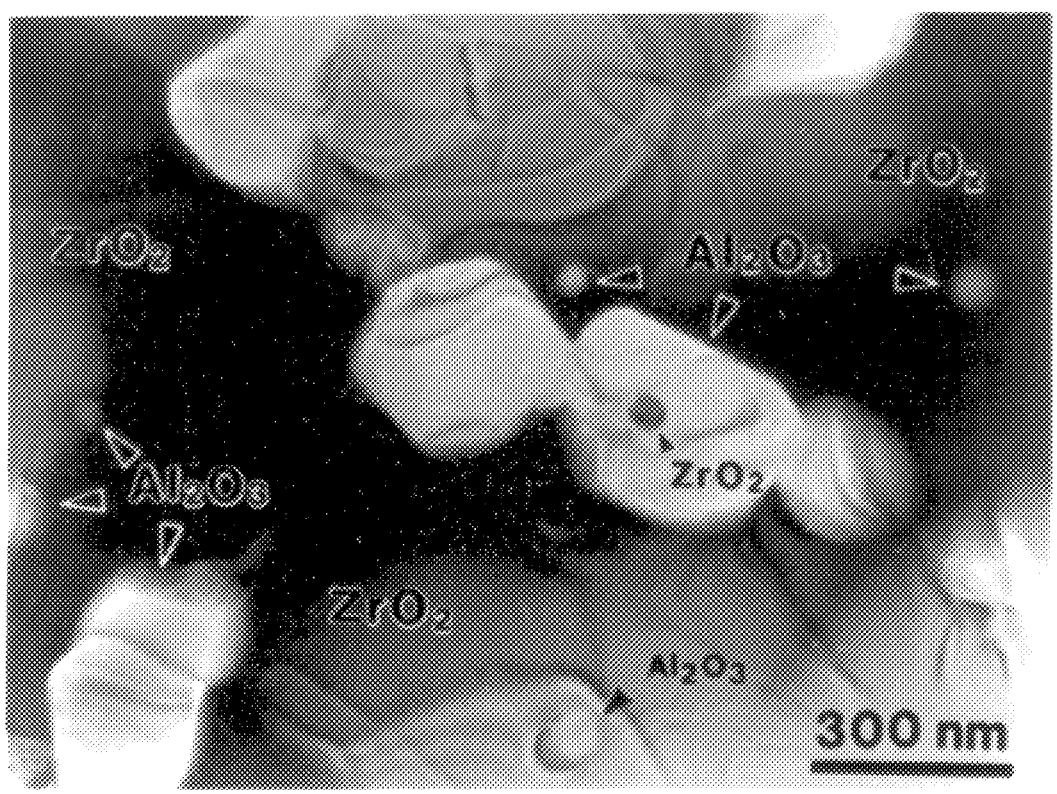
FIG. 1 is a transmission electron micrograph of a zirconia based ceramic material of Example 20 of the present invention.

A zirconia based ceramic material of the present invention consists essentially of 0.5 to 50 vol % of $Al_2O_3$ grains having an average grain size of 2 μm or less and the balance of grains of a partially stabilized zirconia having an average grain size of 5 μm or less. The partially stabilized zirconia consists essentially of 8 to 12 mol % of $CeO_2$, 0.05 to 4 mol % of $TiO_2$ and the balance of $ZrO_2$. When the content of $CeO_2$ is less than 8 mol %, a stabilization of tetragonal zirconia is not enough, and a formation of monoclinic zirconia is enhanced so that micro cracks will develop in the ceramic material. When the content of $CeO_2$ is more than 12 mol %, the tetragonal zirconia is excessively stabilized, so that the mechanical toughness of the ceramic material can not be sufficiently improved by a mechanism of a stress induced phase transformation from tetragonal zirconia to monoclinic zirconia. In a $ZrO_2$-$TiO_2$ phase diagram, it is known that the tetragonal zirconia forms a solid solution with about 18 mol % or less of $TiO_2$ at a high temperature. $TiO_2$ is capable of keeping the tetragonal zirconia metastably at a room temperature as well as $Y_2O_3$ and $CeO_2$, and enhancing a grain growth of $ZrO_2$. Therefore, when an excess amount of $TiO_2$ is used as a stabilizer of the tetragonal zirconia, the mechanical strength of the ceramic material would be lowered due to the occurrence of an abnormal grain growth of $ZrO_2$. The ceramic material of the present invention has a so called nano-composite structure which is useful to improve the mechanical properties of the ceramic material. That is, fine $Al_2O_3$ grains having an average grain size of 1 μm or less are dispersed within the grains of the partially stabilized zirconia at a dispersion ratio. The dispersion ratio is defined as a ratio of the number of $Al_2O_3$ grains dispersed within the grains of the partially stabilized zirconia relative to the number of the entire $Al_2O_3$ grains dispersed in the ceramic material. In the present invention, the dispersion ratio is at least 2%. Therefore, a controlled grain growth of the grains of the partially stabilized zirconia is required to form the nano-composite structure. When the content of $TiO_2$ is less than 0.05 mol %, a required grain growth of the partially stabilized zirconia for the nano-composite structure is not achieved. When the content of $TiO_2$ is more than 4 mol %, the abnormal grain growth of the partially stabilized zirconia happens, so that it will act as a fracture origin of the ceramic material. Therefore, only when both of the $TiO_2$ and $CeO_2$ contents are in the present ranges, it is possible to provide the nano-composite structure of the ceramic material while enhancing the stabilization of tetragonal zirconia without causing the abnormal grain growth of the partially stabilized zirconia. In addition, only when both of the $TiO_2$ and $CeO_2$ contents are in the present ranges, it is possible to obtain an adequate critical stress necessary for causing the stress induced phase transformation to thereby improve the mechanical strength and toughness of the ceramic material. In this case, it is preferred that the partially stabilized zirconia contains at least 90 vol % of the tetragonal zirconia and 10 vol % or less of the monoclinic zirconia.

In the present invention, the $Al_2O_3$ content in the ceramic material is in a range of 0.5 to 50 vol %, and more preferably 20 to 40 vol %. When the $Al_2O_3$ content is less than 0.5 vol %, the formation of the nano-composite structure is not enough. As the $Al_2O_3$ content is increased more than 50 vol %, an improvement of mechanical toughness of the ceramic material by the partially stabilized zirconia is prevented.

The nano-composite structure of the present ceramic material is explained in detail as below. A residual stress field is formed around each of the $Al_2O_3$ grains dispersed within the grains of the partially stabilized zirconia by a mismatch of thermal expansion coefficient between the partially stabilized zirconia and $Al_2O_3$, so that the grains of the partially stabilized zirconia are considerably reinforced. That is, a large number of dislocations are generated within the grains of the partially stabilized zirconia by the residual stress field. The dislocations are piled up each other to form sub-grain boundaries within the grains of the partially stabilized zirconia. The formation of sub-grain boundaries provides a fine grain structure to the partially stabilized zirconia and is useful to increase the critical stress necessary for causing the stress induced phase transformation. In addition, since cracks developed in the ceramic material are bowed or deflected by the $Al_2O_3$ grains uniformly dispersed in the grain boundaries of the partially stabilized zirconia, further progresses of the cracks would be effectively prevented to improve the fracture toughness of the ceramic material. These advantages of the nano-composite structure of the ceramic material are efficiently obtained when the ceramic material is formed with the $Al_2O_3$ grains having the average grain size of 2 $\mu m$ or less and the grains of the partially stabilized zirconia having the average grain size of 5 $\mu m$ or less, and also the $Al_2O_3$ grains having an average grain size of 1 $\mu m$ or less are dispersed within the grains of the partially stabilized zirconia at the dispersion ratio of at least 2%. Furthermore, it is preferred that the grains of the partially stabilized zirconia having an average grain size of 1 $\mu m$ or less are partly dispersed within grains of $Al_2O_3$, so that the $Al_2O_3$ grains are reinforced by the residual stress field resulting from the mismatch of thermal expansion coefficient and the formation of sub-grain boundaries therein.

A process of making the ceramic material of the present invention is explained in detail. A first constituent formed of the partially stabilized zirconia consisting essentially of 8 to 12 mol % of $CeO_2$ and 0.05 to 4 mol % of $TiO_2$ and the balance of $ZrO_2$ is mixed with a second constituent formed of $Al_2O_3$ such that the ceramic material essentially consists of 0.5 to 50 vol % of $Al_2O_3$ and the balance of the partially stabilized zirconia. A resultant mixture is molded into a desired shape to form a green compact thereof. The green compact is sintered in an oxidizing atmosphere under an atmospheric pressure to obtain the ceramic material. In particular, when the sintering step is carried out to obtain the ceramic material having a relative density of 95% or more, it is preferred that after the sintering step, a hot-isostatic pressing (HIP) treatment is performed to the ceramic material in an oxygen gas containing atmosphere to remove residual pores and further improve the mechanical strength and toughness of the ceramic material. For example, a mixture gas of oxygen gas and a rare gas such as argon may be used as the oxygen gas containing atmosphere. In this case, it is preferred that the mixture gas contains 5 vol % or more of the oxygen gas.

The first constituent can be prepared by any one of the following sub-processes [1] to [3].

In the sub-process [1], a powder of a first partially stabilized zirconia having an average grain size of 0.5 $\mu m$ or less and containing only $CeO_2$ is mixed with a $TiO_2$ powder having an average grain size of 0.5 $\mu m$ or less. For example, these powders may be ball-milled in the presence of a solvent such as ethanol, acetone or toluene, or the like, to obtain the mixed powder. The mixed powder is heated at a temperature of 800° to 1000° C. to obtain a calcined powder. At the temperature, $TiO_2$ forms a solid solution with $ZrO_2$ to stabilize tetragonal zirconia. The calcined powder is pulverized to obtain a powder of the partially stabilized zirconia as the first constituent.

In the sub-process [2], an aqueous solution of a zirconium salt is mixed with an aqueous solution including cerium and titanium salts to obtain a mixed aqueous solution. The mixed solution is hydrolyzed by adding an alkali aqueous solution thereto, to thereby generate a precipitate. The precipitate is dried and heated to obtain a first calcined powder. For example, the precipitate may be heated at a temperature of about 800° C. in the air. Then, the calcined powder is pulverized to obtain a powder of the partially stabilized zirconia as the first constituent. For example, the calcined powder may be ball-milled in the presence of a solvent.

In the sub-process [3], an aqueous solution including zirconium and cerium salts is mix ed with an organic solution of an alkoxide of titanium to obtain a mixed solution. The mixed solution is hydrolyzed by adding an alkali aqueous solution thereto, to thereby generate a precipitate. To obtain a powder of the partially stabilized zirconia as the first constituent from the precipitate, the same procedure as the sub-process [2] may be adopted.

It is preferred to use as the second constituent a powder of $\alpha$-$Al_2O_3$ having an average grain size of 0.5 $\mu m$ or less or a powder of $\gamma$-$Al_2O_3$ having a specific surface area of 100 $m^2/g$ or more. In addition, the second constituent can be prepared by any one of the following sub-processes [4] and [5].

In the sub-process [4], an aqueous solution of aluminum salt is hydrolyzed by adding an alkali aqueous solution such as aqueous ammonia thereto, to thereby generate a precipitate. The precipitate is dried and heated at a temperature of about 800° C. for several hours in the air to obtain an $Al_2O_3$ powder as the second constituent.

In the sub-process [5], an organic solution of an alkoxide of aluminum is hydrolyzed to obtain a precipitate. The precipitate is dried and heated at a temperature of about 800° C. for several hours in the air to obtain an $Al_2O_3$ powder as the second constituent.

The mixture of the first and second constituents can be prepared by any one of the following sub-processes [6] to [8].

In the sub-process [6], a powder of the partially stabilized zirconia containing $CeO_2$ and $TiO_2$ as the first constituent is mixed with an aqueous solution of an aluminum salt as the second constituent to obtain a mixed solution. The mixed solution is hydrolyzed by adding an alkali aqueous solution such as aqueous ammonia thereto, to thereby generate a precipitate.

The precipitate is dried and heated to obtain a mixed powder of $Al_2O_3$ and the partially stabilized zirconia as the mixture of the first and second constituents. For example, the precipitate may be heated at a temperature of about 800° C. for several hours.

In the sub-process [7], a powder of the partially stabilized zirconia containing $CeO_2$ and $TiO_2$ as the first constituent is mixed with an organic solution of an alkoxide of aluminum as the second constituent to obtain a mixed solution. The mixed solution is hydrolyzed to generate a precipitate.

To obtain a mixed powder of $Al_2O_3$ and the partially stabilized zirconia as the mixture of the first and second constituents from the precipitate, the same procedure as the sub-process [6] may be adopted.

In each of the sub-processes [6] and [7], it is preferred to use as the first constituent the powder of the partially stabilized zirconia prepared by any one of the above sub-processes [1] to [3].

In the sub-process [8], a first aqueous solution of zirconium is hydrolyzed by an alkali aqueous solution to prepare a sol solution of zirconia. The sol solution is mixed with a second aqueous solution including cerium and titanium salts and a third aqueous solution of an aluminum salt as the second constituent to obtain a mixed aqueous solution. The mixed solution is hydrolyzed by adding an alkali aqueous solution thereto, to thereby generate a precipitate. The precipitate is dried and heated to obtain a mixed powder of $Al_2O_3$ and the partially stabilized zirconia as the mixture of the first and second constituents. For example, the precipitate may be heated at a temperature of about 800° C. for several hours.

In case of using the powder of the partially stabilized zirconia prepared by the sub-process [2] or [3] as the first constituent, the powder of $\gamma$-$Al_2O_3$ having a specific surface area of 100 m²/g or more as the second constituent, or the mixed powder prepared by any one of the sub-processes [6] to [8] as the mixture of the first and second constituents, there is a probability of causing inconvenience to the molding and sintering steps because each of those powders has an extremely large specific surface area, in other words, exhibits a poor compactibility. In particular, it would be difficult to mold such a powder into a desired shape by a regular dry pressing or injection molding method. Therefore, it is preferred that a mixed powder of the powder of the partially stabilized zirconia prepared by the sub-process [2] or [3] and an $Al_2O_3$ powder as the second constituent is heated at a temperature of 1000° C. or more and less than a sintering temperature thereof to obtain a second calcined powder, and then pulverized to control a particle size of the second calcined powder prior to the molding and sintering steps. Similarly, it is preferred that a mixed powder of a powder of the partially stabilized zirconia as the first constituent and the powder of $\gamma$-$Al_2O_3$ having a specific surface area of 100 m²/g or more is heated at a temperature of 1000° C. or more and less than a sintering temperature thereof to obtain a calcined powder, and then pulverized to control a particle size of the calcined powder prior to the molding and sintering steps. In addition, it is preferred that the mixed powder prepared by any one of the sub-processes [6] to [8] is heated at a temperature of 1000° C. or more and less than a sintering temperature thereof to obtain a calcined powder, and then pulverized to control a particle size of the calcined powder prior to the molding and sintering steps. For example, the calcined powder may be ball-milled in the presence of a solvent.

EXAMPLES 1 to 17

A zirconia based ceramic material of Example 1 was produced by the following process. A powder of a first partially stabilized zirconia containing $CeO_2$ and having an average grain size of 0.3 $\mu$m and a $TiO_2$ powder having an average grain size of 0.3 $\mu$m were ball-milled in the presence of ethanol for 24 hours by the use of balls made of a partially stabilized zirconia and a polyethylene vessel, and then dried to obtain a first mixed powder. The first mixed powder was heated at 800° C. in the air for 3 hours to obtain a calcined powder of a second partially stabilized zirconia containing $CeO_2$ and $TiO_2$. As listed in Table 1, the second partially stabilized zirconia of Example 1 contains 8 mol % of $CeO_2$ and 1 mol % of $TiO_2$. The calcined powder and a powder of $\alpha$-$Al_2O_3$ having an average grain size of 0.2 $\mu$m were ball-milled in the presence of ethanol for 24 hours by the use of the zirconia balls and the polyethylene vessel, and then dried to obtain a second mixed powder. As listed in Table 1, an additive amount of the $\alpha$-$Al_2O_3$ powder was determined such that the ceramic material of Example 1 contains 30 vol % of $Al_2O_3$. The second mixed powder was molded into a disk having the diameter of 60 mm and the thickness of 5 mm by means of a one-axis press molding and cold isostatic pressing (CIP) treatment. The disk was sintered at 1500° C. in the air for 2 hours under an atmospheric pressure to obtain a disk-shaped sintered product of the zirconia based ceramic material of Example 1. Each of ceramic materials of Examples 2 to 17 was made in accordance with the same process as Example 1 except for different $CeO_2$ and $TiO_2$ contents, as listed in Table 1.

Each of the sintered products of Examples 1 to 17 reaches a relative density of 99% or more. It was observed by the use of scanning electron microscope and transmission electron microscope that as the $TiO_2$ content is greater, average grain sizes of the partially stabilized zirconia and $Al_2O_3$ are increased without depending on the $CeO_2$ content. The average grain size of the partially stabilized zirconia is in a range of 0.8 to 4.8 $\mu$m. The average grain size of $Al_2O_3$ is less that 2 $\mu$m. It was also observed that fine grains of $Al_2O_3$ having an average grain size of 1 $\mu$m or less are dispersed within grains of the partially stabilized zirconia at a dispersion ratio listed in Table 1, and also fine grains of the partially stabilized zirconia having an average grain size of 1 $\mu$m or less are partly dispersed within relatively large $Al_2O_3$ grains. To estimate mechanical strength of the ceramic material, a three point bending strength was measured according to the test method of JIS (Japanese Industrial Standard) R1601. For measuring the bending strength, specimens of 4×3×40 mm of the ceramic material were formed by cutting, grinding and polishing the disk-shaped sintered product. In addition, fracture toughness of the ceramic material was measured in accordance with IF method. The test results are listed in Table 1. Furthermore, the identification of crystal phases of the partially stabilized zirconia and quantification of the crystal phases were carried out by means of a X-ray diffraction analysis. In Table 1, "T", "C" and "M" designate tetragonal zirconia, cubic zirconia and monoclinic zirconia, respectively. The partially stabilized zirconia of each of Examples 1 and 2 contains at least 90 vol % of the tetragonal zirconia and less than 10 vol % of the monoclinic zirconia.

The partially stabilized zirconia of each of Examples 3 to 17 substantially consists of the tetragonal zirconia. To determine a dispersion ratio (W), which is defined as a ratio of the number of the $Al_2O_3$ grains dispersed within the grains of the partially stabilized zirconia relative to the number of the entire $Al_2O_3$ grains dispersed in the ceramic material, the number (S) of the entire $Al_2O_3$ grains dispersed at an observation area in the ceramic material and the number (n) of the $Al_2O_3$ grains dispersed within the grains of the partially stabilized zirconia at the observation area were counted by using the transmission electron microscope (TEM) or scanning electron microscope (SEM). The dispersion ratio (W) is represented by substituting the counted numbers (S) and (n) into the following equation: $W(\%)=(n/S)\times100$. Results are listed in Table 1.

COMPARATIVE EXAMPLES 1 to 3

Each of zirconia based ceramic materials of Comparative Examples 1 to 3 was produced in accordance with the same process as Example 1 except for different contents of $CeO_2$ and $TiO_2$, as listed in Table 2. SEM and TEM observations, the measurements of bending strength and fracture toughness, and X-ray diffraction analysis were performed to the respective ceramic materials of Comparative Examples 1 to 3. Results are also listed in Table 2.

Since large cracks developed in the ceramic material of Comparative Example 1 after the sintering step, the measurements of the mechanical properties were not performed.

By the X-ray diffraction analysis, it was identified that a partially stabilized zirconia of the ceramic material of Comparative Example 1 contains about 80 vol % of monoclinic zirconia. The ceramic material of Comparative Example 2 was densely sintered. It was observed by the SEM and TEM observations that average grain sizes of a partially stabilized zirconia and $Al_2O_3$ of the ceramic material of Comparative Example 2 are about 0.5 $\mu$m. In addition, it was observed that most of $Al_2O_3$ grains are dispersed in grain boundaries of the partially stabilized zirconia, and a dispersion ratio of the $Al_2O_3$ grains dispersed within the grains of the partially stabilized zirconia is 0.8%. Since $TiO_2$ was not used in Comparative Example 2, the bending strength of the ceramic material was only 520 MPa. It was identified by the X-ray diffraction analysis that the partially stabilized zirconia of Comparative Example 2 contains about 20 vol % of monoclinic zirconia. On the other hand, it was observed that the ceramic material of Comparative Example 3 comprises $Al_2O_3$ grains dispersed within grains of a partially stabilized zirconia, abnormally grown $ZrO_2$ grains of about 15 to 20 $\mu$m, and residual pores left within the grains and at triple points of the partially stabilized zirconia. Since the partially stabilized zirconia of Comparative Example 3 contains an excess amount of $TiO_2$, i.e., 8 mol %, the ceramic material exhibited low bending strength and fracture toughness, as listed in Table 2. It was identified by the X-ray diffraction analysis that the partially stabilized zirconia of Comparative Example 3 contains a small amount of cubic zirconia.

TABLE 1

|  | $Al_2O_3$ Content (vol %) | $CeO_2$ Content (mol %) | $TiO_2$ Content (mol %) | Average Grain Size of PSZ($\mu$m) | Average Grain Size of $Al_2O_3$($\mu$m) | Crystal phase of PSZ | Bending Strength (MPa) | Fracture Toughness (MPa·$m^{1/2}$) | Dispersion Ratio of $\alpha$-$Al_2O_3$(%) |
|---|---|---|---|---|---|---|---|---|---|
| Example 1 | 30 | 8 | 1 | 2.2 | 1.0 | T + M | 720 | 21.5 | 3.1 |
| Example 2 | 30 | 8 | 2 | 2.8 | 1.1 | T + M | 790 | 20.1 | 3.4 |
| Example 3 | 30 | 8 | 3 | 3.7 | 1.3 | T | 820 | 18.0 | 3.8 |
| Example 4 | 30 | 8 | 4 | 4.8 | 1.8 | T | 600 | 13.9 | 4.4 |
| Example 5 | 30 | 10 | 0.2 | 1.1 | 0.5 | T | 1140 | 17.5 | 2.7 |
| Example 6 | 30 | 10 | 0.5 | 1.6 | 0.6 | T | 1120 | 16.3 | 3.0 |
| Example 7 | 30 | 10 | 1 | 2.1 | 0.7 | T | 1090 | 15.7 | 3.3 |
| Example 8 | 30 | 10 | 2 | 2.7 | 0.9 | T | 1060 | 13.9 | 3.7 |
| Example 9 | 30 | 10 | 3 | 3.6 | 1.1 | T | 960 | 11.8 | 3.9 |
| Example 10 | 30 | 10 | 4 | 4.6 | 1.6 | T | 830 | 10.5 | 4.5 |
| Example 11 | 30 | 12 | 0.05 | 0.8 | 0.5 | T | 1000 | 11.5 | 2.5 |
| Example 12 | 30 | 12 | 0.1 | 1.0 | 0.6 | T | 1100 | 11.0 | 2.8 |
| Example 13 | 30 | 12 | 0.5 | 1.5 | 0.6 | T | 1010 | 9.6 | 3.2 |
| Example 14 | 30 | 12 | 1 | 2.0 | 0.7 | T | 970 | 8.8 | 3.4 |
| Example 15 | 30 | 12 | 2 | 2.6 | 0.8 | T | 950 | 7.8 | 3.9 |
| Example 16 | 30 | 12 | 3 | 3.5 | 1.0 | T | 800 | 7.1 | 4.1 |
| Example 17 | 30 | 12 | 4 | 4.3 | 1.5 | T | 670 | 6.6 | 4.6 |

*PSZ = Partially Stabilized Zirconia

TABLE 2

|  | $Al_2O_3$ Content (vol %) | $CeO_2$ Content (mol %) | $TiO_2$ Content (mol %) | Average Grain Size of PSZ($\mu$m) | Average Grain Size of $Al_2O_3$($\mu$m) | Crystal phase of PSZ | Bending Strength (MPa) | Fracture Toughness (MPa·$m^{1/2}$) | Dispersion Ratio of $\alpha$-$Al_2O_3$(%) |
|---|---|---|---|---|---|---|---|---|---|
| Comparative Example 1 | 30 | 6 | 1 | — | — | T + M | — | — | — |
| Comparative Example 2 | 30 | 8 | 0 | 0.5 | 0.5 | T + M | 520 | 22.1 | 0.8 |
| Comparative Example 3 | 30 | 12 | 8 | 10 | 3.5 | T + C | 340 | 4.1 | 5.5 |

*PSZ = Partially Stabilized Zirconia

EXAMPLES 18 to 22 AND COMPARATIVE EXAMPLES 4 AND 5

A zirconia based ceramic material of Example 18 was produced by the following process. A powder of a first partially stabilized zirconia containing 10 mol % of $CeO_2$ and a $TiO_2$ powder were ball-milled in the presence of ethanol for 24 hours by the use of balls made of a partially stabilized zirconia and a polyethylene vessel, and then dried to obtain a first mixed powder. An additive amount of the $TiO_2$ powder was determined such that a partially stabilized zirconia in the ceramic material of Example 18 contains 1 mol % of $TiO_2$. The first mixed powder was heated at 800° C. in the air for 3 hours to obtain a calcined powder of the partially stabilized zirconia containing 10 mol % of $CeO_2$ and 1 mol % of $TiO_2$. The calcined powder and a 99.9% or more pure $\alpha$-$Al_2O_3$ powder having an average grain size of 0.2 μm were ball-milled in the presence of ethanol for 24 hours by the use of the zirconia balls and the polyethylene vessel, and then dried to obtain a second mixed powder. As listed in Table 3, an additive amount of the $Al_2O_3$ powder was determined such that the ceramic material of Example 18 contains 10 vol % of $Al_2O_3$. The second mixed powder was molded into a disk having the diameter of 60 mm and the thickness of 5 mm by means of a one-axis press molding method and cold isostatic pressing (CIP) treatment. The disk was sintered at 1500° C. in the air under an atmospheric pressure for 2 hours to obtain a disk-shaped sintered product of the zirconia based ceramic material of Example 18. Each of ceramic materials of Examples 19 to 22 and Comparative Examples 4 and 5 was produced in accordance with the same process as Example 18 except for different content of $Al_2O_3$, as listed in Table 3.

Each of the ceramic materials of Examples 18 to 22 and Comparative Examples 4 and 5 reaches a relative density of 99% or more. As the content of $Al_2O_3$ is increased, it was observed that a grain growth of the partially stabilized zirconia is prevented more efficiently. In the ceramic material of Comparative Example 4 in which the $Al_2O_3$ powder is not added, it was observed that an average grain size of the partially stabilize zirconia is about 5 μm. As the $Al_2O_3$ content in the ceramic material is increased, it was observed that the average grain size of the partially stabilized zirconia is decreased. In Examples 18 to 22, the average grain size of the partially stabilized zirconia is in a range of 1.2 to 3.0 μm. Additionally, in the ceramic materials containing 30 vol % or more of $Al_2O_3$, it was observed that a sintering between $Al_2O_3$ grains is enhanced, and a large number of $Al_2O_3$ grains are dispersed in grain boundaries of the partially stabilized zirconia. As shown in FIG. 1, a transmission electron micrograph of the ceramic material of Example 20 indicates that the ceramic material has a so called mutual nano-composite structure, in which fine $Al_2O_3$ grains are partly dispersed within grains of the partially stabilized zirconia and also fine grains of the partially stabilized zirconia are partly dispersed within $Al_2O_3$ grains having the grain size of about 1 μm. The $Al_2O_3$ grains having the grain size of about 1 μm are dispersed in the grain boundaries of the partially stabilized zirconia. By X-ray diffraction analysis, it was identified that the partially stabilized zirconia of each of the ceramic materials of the Examples 18 to 22 and Comparative Examples 4 and 5 contains at least 95 vol % of tetragonal zirconia and 5 vol % or less of monoclinic zirconia. To estimate mechanical strength of the ceramic material, a three point bending strength was measured according to the test method of JIS (Japanese Industrial Standard) R1601. For measuring the bending strength, specimens of 4×3×40 mm of the ceramic material were formed by cutting, grinding and polishing the disk-shaped sintered product. In addition, fracture toughness and Vickers hardness of the ceramic material were measured. The test results are listed in Table 3. To determine a dispersion ratio (W), which is defined as a ratio of the number of the $Al_2O_3$ grains dispersed within the grains of the partially stabilized zirconia relative to the number of the entire $Al_2O_3$ grains dispersed in the ceramic material, the number (S) of the entire $Al_2O_3$ grains dispersed at an observation area in the ceramic material and the number (n) of the $Al_2O_3$ grains dispersed within the grains of the partially stabilized zirconia at the observation area were counted by using the transmission electron microscope (TEM) or by observing a polished and heat-treated surface of the sintered product with the use of scanning electron microscope (SEM). The dispersion ratio (W) is represented by substituting the counted numbers (S) and (n) into the following equation: $W(\%)=(n/S)\times 100$. Results are also listed in Table 3.

EXAMPLE 23

A zirconia based ceramic material of Examples 23 was produced in accordance with the same process as Example 20 except for the sintering temperature is 1450° C. In this Example, after the sintering step, a hot isostatic pressing (HIP) treatment was performed to the ceramic material for 1 hour at the temperature of 1350° C. under the pressure of 150 MPa of a mixture gas consisting of 10 vol % of oxygen and the balance of argon. The ceramic material was densified without leaving residual pores therein by the HIP treatment to reach a theoretical density thereof. By TEM and SEM observations of the ceramic material, it was observed that the ceramic material has a so called mutual nano-composite structure, in which fine $Al_2O_3$ grains are dispersed within grains of the partially stabilized zirconia and also fine grains of the partially stabilized zirconia are dispersed within relatively large $Al_2O_3$ grains. No grain growth caused by the HIP treatment was observed. Average grain sizes of the partially stabilized zirconia and $Al_2O_3$ of this ceramic material are 1.5 μm and 0.5 μm, respectively. By X-ray diffraction analysis, it was identified that the partially stabilized zirconia contains at least 99 vol % of tetragonal zirconia. Measurements of bending strength, Vickers hardness and fracture toughness of the ceramic material were performed according to the same procedures as Example 1. Results are listed in Table 4.

COMPARATIVE EXAMPLE 6

A zirconia based ceramic material of Comparative Example 6 was produced in accordance with the same process as Example 20 except for using a 99.9% or more pure $\alpha$-$Al_2O_3$ powder having the average grain size of 3 μm. A relative density of the ceramic material reaches 99% or more. By TEM and SEM observations of the ceramic material, it was observed that most of $Al_2O_3$ grains are dispersed in grain boundaries of a partially stabilized zirconia. In addition, it was identified by X-ray diffraction analysis that the partially stabilized zirconia contains at least 95 vol % of tetragonal zirconia. Measurements of bending strength, Vickers hardness and fracture toughness of the ceramic material were performed according to the same procedures as Example 1. Results are listed in Table 4.

TABLE 3

|  | $Al_2O_3$ Content (vol %) | $CeO_2$ Content (mol %) | $TiO_2$ Content (mol %) | Average Grain Size of PSZ(μm) | Average Grain Size of $Al_2O_3$(μm) | Vickers Hardness (GPa) | Bending Strength (MPa) | Fracture Toughness (MPa·m$^{1/2}$) | Dispersion Ratio of α-$Al_2O_3$(%) |
|---|---|---|---|---|---|---|---|---|---|
| Comparative Example 4 | 0 | 10 | 1 | 5.0 | — | 7.5 | 460 | 24.0 | — |
| Example 18 | 10 | 10 | 1 | 3.0 | 0.5 | 9.1 | 790 | 22.3 | 2.2 |
| Example 19 | 20 | 10 | 1 | 2.5 | 0.6 | 10.3 | 1020 | 18.8 | 2.8 |
| Example 20 | 30 | 10 | 1 | 2.1 | 0.7 | 11.2 | 1090 | 15.7 | 3..3 |
| Example 21 | 40 | 10 | 1 | 1.5 | 0.7 | 12.2 | 1070 | 11.9 | 2.6 |
| Bxample 22 | 50 | 10 | 1 | 1.2 | 0.8 | 13.4 | 900 | 7.6 | 2.0 |
| Comparative Example 5 | 60 | 10 | 1 | 1.0 | 1.0 | 14.4 | 510 | 4.4 | 0.9 |

*PSZ = Partially Stabilized Zirconia

TABLE 4

|  | $Al_2O_3$ Content (vol %) | $CeO_2$ Content (mol %) | $TiO_2$ Content (mol %) | Average Grain Size of PSZ(μm) | Average Grain Size of $Al_2O_3$(μm) | Vickers Hardness (GPa) | Bending Strength (MPa) | Fracture Toughness (MPa·m$^{1/2}$) | Dispersion Ratio of α-$Al_2O_3$(%) |
|---|---|---|---|---|---|---|---|---|---|
| Example 23 | 30 | 10 | 1 | 1.5 | 0.5 | 11.7 | 1450 | 16.3 | 3.4 |
| Comparative Bxample 6 | 30 | 10 | 1 | 2.3 | 3.5 | 10.6 | 720 | 16.6 | 0.3 |

*PSZ = Partially Stabilized Zirconia

EXAMPLE 24

A zirconia based ceramic material of Example 24 was produced by the following process. A first aqueous solution of zirconium oxychloride ($ZrOCl_2.8H_2O$) was hydrolyzed by adding aqueous ammonia thereto, to prepare a sol solution of zirconia. The sol solution was mixed with a second aqueous solution of cerium chloride ($CeCl_3.7H_2O$) and a third aqueous solution of titanium chloride ($TiCl_4$), while agitating a resultant mixture. The mixture was dropped into aqueous ammonia, while agitating the aqueous ammonia, to thereby obtain a precipitate. The concentrations of the second and third aqueous solutions were determined such that a partially stabilized zirconia of the ceramic material contains 11 mol % of $CeO_2$ and 1 mol % of $TiO_2$. After the precipitate was washed with water and then dried, it was heated at 850° C. in the air for 3 hours to obtain a calcined powder of the partially stabilized zirconia. The calcined powder and a γ-$Al_2O_3$ powder having a specific surface area of 300 m$^2$/g were ball-milled in the presence of ethanol for 24 hours by the use of balls made of a partially stabilized zirconia and a polyethylene vessel, and then dried to obtain a mixed powder. An additive amount of the γ-$Al_2O_3$ powder was determined such that the ceramic material contains 30 vol % of $Al_2O_3$. The mixed powder was molded into a disk having the diameter of 60 mm and the thickness of 5 mm by means of a one-axis press molding and cold isostatic pressing (CIP) treatment. The disk was sintered at 1500° C. in the air under an atmospheric pressure for 2 hours to obtain a disk-shaped sintered product of the zirconia based ceramic material.

A relative density of this sintered product reaches 99% or more. By SEM and TEM observations, it was observed that a relatively large number of $Al_2O_3$ grains are dispersed within grains of the partially stabilized zirconia. In addition, by X-ray diffraction analysis, it was identified that the partially stabilized zirconia contains at least 95 vol % of tetragonal zirconia and less than 5 vol % of monoclinic zirconia. The γ-$Al_2O_3$ powder in the mixed powder were completely converted into α-$Al_2O_3$ during the sintering step. Measurements of bending strength, Vickers hardness and fracture toughness of the ceramic material were carried out according to the same procedure as Example 1. Results are listed in Table 5.

EXAMPLE 25

A zirconia based ceramic material of Example 25 was produced by the following process. A powder of a partially stabilized zirconia, which is the same as the calcined powder prepared in Example 24, was mixed with a hydrochloride solution of aluminum chloride ($AlCl_3$), while agitating a resultant mixture. The concentration of the hydrochloride solution was determined such that the ceramic material contains 30 vol % of $Al_2O_3$. The mixture was hydrolyzed by an aqueous solution of sodium hydroxide (NaOH) to generate a precipitate. After the precipitate was washed with water and then dried, it was heated at 1000° C. in the air for 3 hours to obtain a mixed powder. The mixed powder was molded into a disk having the diameter of 60 mm and the thickness of 5 mm by means of a one-axis press molding and cold isostatic pressing (CIP) treatment. The disk was sintered at 1500° C. in the air under an atmospheric pressure for 2 hours to obtain a disk-shaped sintered product of the zirconia based ceramic material.

A relative density of this sintered product reaches 99% or more. By SEM and TEM observations, it was observed that a relatively large number of $Al_2O_3$ grains are dispersed within grains of the partially stabilized zirconia. In addition, by X-ray diffraction analysis of the ceramic material, it was identified that the partially stabilized zirconia contains at least 95 vol % of tetragonal zirconia and less than 5 vol % of monoclinic zirconia. Measurements of bending strength, Vickers hardness and fracture toughness of the ceramic material were carried out according to the same procedure as Example 1. Results are listed in Table 5.

EXAMPLE 26

A zirconia based ceramic material of Example 26 was produced by the following process. A first aqueous solution of zirconium oxychloride ($ZrOCl_2 \cdot 8H_2O$) was hydrolyzed by adding aqueous ammonia thereto, to prepare a sol solution of zirconia. The sol solution was mixed with a second aqueous solution of cerium chloride ($CeCl_3 \cdot 7H_2O$) and a first isopropanol solution of titanium isopropoxide [Ti($iOC_3H_7$)$_4$], while agitating a resultant mixture. The mixture was dropped into aqueous ammonia, while agitating the aqueous ammonia, to thereby obtain a first precipitate. The concentrations of the second aqueous solution and first isopropanol solution were determined such that a partially stabilized zirconia of the ceramic material contains 11 mol % of $CeO_2$ and 1 mol % of $TiO_2$. After the first precipitate was washed with water and then dried, it was heated at 850° C. in the air for 3 hours to obtain a calcined powder of the partially stabilized zirconia. The calcined powder was mixed with a second isopropanol solution of aluminum isopropoxide [Al($iOC_3H_7$)$_3$] to obtain a mixed solution. The concentration of the second isopropanol solution was determined such that the ceramic material contains 30 vol % of $Al_2O_3$. The mixed solution was hydrolyzed to obtain a second precipitate. After the second precipitate is washed with water and then dried, it was heated at 1000° C. in the air for 3 hours to obtain a mixed powder. The mixed powder was molded into a disk having the diameter of 60 mm and the thickness of 5 mm by means of a one-axis press molding contains 11 mol % of $CeO_2$ and 1 mol % of $TiO_2$. The concentration of the fourth aqueous solution was determined such that the ceramic material contains 30 vol % of $Al_2O_3$. The mixture was dropped into aqueous ammonia, while agitating the aqueous ammonia, to thereby obtain a precipitate. After the precipitate was washed with water and then dried, it was heated at 1000° C. in the air for 3 hours to obtain a mixed powder. The mixed powder was molded into a disk having the diameter of 60 mm and the thickness of 5 mm by means of a one-axis press molding and cold isostatic pressing (CIP) treatment. The disk was sintered at 1500° C. in the air for 2 hours under an atmospheric pressure to obtain a disk-shaped sintered product of the zirconia based ceramic material.

A relative density of this sintered product reaches 99% or more. By SEM and TEM observations, it was observed that a relatively large number of $Al_2O_3$ grains are dispersed within grains of the partially stabilized zirconia. In addition, by X-ray diffraction analysis of the ceramic material, it was identified that the partially stabilized zirconia contains at least 95 vol % of tetragonal zirconia and less than 5 vol % of monoclinic zirconia. Measurements of bending strength, Vickers hardness and fracture toughness of the ceramic material were carried out according to the same procedure as Example 1. Results are listed in Table 5.

TABLE 5

|  | $Al_2O_3$ Content (vol %) | $CeO_2$ Content (mol %) | $TiO_2$ Content (mol %) | Average Grain Size of PSZ($\mu$m) | Average Grain Size of $Al_2O_3$($\mu$m) | Vickers Hardness (GPa) | Bending Strength (MPa) | Fracture Toughness (MPa · m$^{1/2}$) | Dispersion Ratio of $\alpha$-$Al_2O_3$(%) |
|---|---|---|---|---|---|---|---|---|---|
| Example 24 | 30 | 11 | 1 | 1.9 | 0.5 | 11.4 | 1130 | 12.9 | 3.9 |
| Example 25 | 30 | 11 | 1 | 2.1 | 0.3 | 11.7 | 1180 | 12.1 | 4.7 |
| Example 26 | 30 | 11 | 1 | 2.1 | 0.3 | 11.3 | 1160 | 12.5 | 4.6 |
| Example 27 | 30 | 11 | 1 | 2.0 | 0.2 | 11.9 | 1220 | 11.8 | 5.0 |

*PSZ = Partially Stabilized Zirconia and cold isostatic pressing (CIP) treatment. The disk was sintered at 1500° C. in the air for 2 hours under an atmospheric pressure to obtain a disk-shaped sintered product of the zirconia based ceramic material.

A relative density of this sintered product reaches 99% or more. By SEM and TEM observations, it was observed that a relatively large number of $Al_2O_3$ grains are dispersed within grains of the partially stabilized zirconia. In addition, by X-ray diffraction analysis of the ceramic material, it was identified that the partially stabilized zirconia contains at least 95 vol % of tetragonal zirconia and less than 5 vol % of monoclinic zirconia. Measurements of bending strength, Vickers hardness and fracture toughness of the ceramic material were carried out according to the same procedure as Example 1. Results are listed in Table 5.

EXAMPLE 27

A zirconia based ceramic material of Example 27 was produced by the following process. A first aqueous solution of zirconium oxychloride ($ZrOCl_2 \cdot 8H_2O$) was hydrolyzed by adding aqueous ammonia thereto, to prepare a sol solution of zirconia. The sol solution was mixed with a second aqueous solution of cerium chloride ($CeCl_3 \cdot 7H_2O$), a third aqueous solution of titanium chloride ($TiCl_4$), and a fourth aqueous solution of aluminum nitrate [Al($NO_3$)$_3$·$9H_2O$], while agitating a resultant mixture. The concentrations of the second and third aqueous solutions were determined such that a partially stabilized zirconia of the ceramic material

What is claimed is:

1. A process of making a zirconia based ceramic material comprising the steps of:
   preparing a mixture of a first constituent formed of a partially stabilized zirconia consisting essentially of 8 to 12 mol % of $CeO_2$, 0.05 to 4 mol % of $TiO_2$ and the balance of $ZrO_2$, and a second constituent formed of $Al_2O_3$, a mixing ratio of said second constituent to said first constituent being such that said ceramic material essentially consists of 0.5 to 50 vol % of $Al_2O_3$ and the balance of said partially stabilized zirconia;
   molding said mixture into a shape to form a green compact; and
   sintering said green compact in an oxidizing atmosphere under an atmospheric pressure to obtain said ceramic material.

2. A process of making a zirconia based ceramic material as set forth in claim 1 comprising the step of performing a hot isostatic pressing (HIP) treatment to said ceramic material in an oxygen gas containing atmosphere after said sintering step.

3. A process of making a zirconia based ceramic material as set forth in claim 1, wherein a powder of said partially stabilized zirconia as said first constituent is prepared by the sub-steps of:
   mixing a powder of a first partially stabilized zirconia containing $CeO_2$ and having an average particle size of 0.5 $\mu$m or less with a powder of $TiO_2$ having an average particle size of 0.5 $\mu$m or less to obtain a mixed powder;

heating said mixed powder to obtain a calcined powder; and pulverizing said calcined powder.

4. A process of making a zirconia based ceramic material as set forth in claim 1, wherein a powder of said partially stabilized zirconia as said first constituent is prepared by the sub-steps of:

mixing a first aqueous solution of a zirconium salt with a second aqueous solution including cerium and titanium salts to obtain a mixed solution;

hydrolyzing the mixed solution with an alkali aqueous solution to generate a precipitate;

drying and heating said precipitate to obtain a first calcined powder; and pulverizing said first calcined powder.

5. A process of making a zirconia based ceramic material as set forth in claim 1, wherein a powder of said partially stabilized zirconia as said first constituent is prepared by the sub-steps of:

mixing an aqueous solution including zirconium and cerium salts with an organic solution of an alkoxide of titanium to obtain a mixed solution;

hydrolyzing said mixed solution with an alkali aqueous solution to generate a precipitate;

drying and heating said precipitate to obtain a first calcined powder; and pulverizing said first calcined powder.

6. A process of making a zirconia based ceramic material as set forth in claim 1, wherein said second constituent is a powder of $\alpha$-$Al_2O_3$ having an average grain size of 0.5 $\mu$m or less.

7. A process of making a zirconia based ceramic material as set forth in claim 1, wherein said second constituent is a powder of $\gamma$-$Al_2O_3$ having a specific surface area of 100 $m^2/g$ or more.

8. A process of making a zirconia based ceramic material as set forth in claim 1, wherein said mixture is prepared by the sub-steps of:

mixing a powder of said partially stabilized zirconia as said first constituent with an aqueous solution of an aluminum salt as said second constituent to obtain a mixed solution;

hydrolyzing said mixed solution with an alkali aqueous solution to generate a precipitate;

drying and heating said precipitate to obtain a mixed powder; and pulverizing said mixed powder.

9. A process of making a zirconia based ceramic material as set forth in claim 1, wherein said mixture is prepared by the sub-steps of:

mixing a powder of said partially stabilized zirconia as said first constituent with an organic solution of an alkoxide of aluminum as said second constituent to obtain a mixed solution;

hydrolyzing said mixed solution to generate a precipitate;

drying and heating said precipitate to obtain a mixed powder; and pulverizing said mixed powder.

10. A process of making a zirconia based ceramic material as set forth in claim 1, wherein said mixture is prepared by the sub-steps of:

hydrolyzing a first aqueous solution of a zirconium salt with an alkali aqueous solution to prepare a sol solution of zirconia;

mixing said sol solution with a second aqueous solution including cerium and titanium salts and a third aqueous solution of an aluminum salt to obtain a mixed solution;

hydrolyzing said mixed solution with an alkali aqueous solution to generate a precipitate;

drying and heating said precipitate to obtain a mixed powder; and pulverizing said mixed powder.

11. A process of making a zirconia based ceramic material as set forth in claim 7, wherein said mixture is prepared by the sub-steps of:

mixing a powder of said partially stabilized zirconia as said first constituent with said powder of $\gamma$-$Al_2O_3$ to obtain a mixed powder;

heating said mixed powder at a temperature of 1000° C. or more and less than a sintering temperature thereof to obtain a calcined powder; and pulverizing said calcined powder.

12. A process of making a zirconia based ceramic material as set forth in claim 4, wherein said mixture is prepared by the sub-steps of:

mixing the powder of said partially stabilized zirconia as said first constituent with an $Al_2O_3$ powder as said second constituent to obtain a mixed powder;

heating said mixed powder at a temperature of 1000° C. or more and less than a sintering temperature thereof to obtain a second calcined powder; and pulverizing said second calcined powder.

13. A process of making a zirconia based ceramic material as set forth in claim 5, wherein said mixture is prepared by the sub-steps of:

mixing the powder of said partially stabilized zirconia as said first constituent with an $Al_2O_3$ powder as said second constituent to obtain a mixed powder;

heating said mixed powder at a temperature of 1000° C. or more and less than a sintering temperature thereof to obtain a second calcined powder; and pulverizing said second calcined powder.

14. A process of making a zirconia based ceramic material as set forth in claim 8 further including a treatment prior to said molding and sintering steps, said treatment comprising the steps of:

heating said mixture at a temperature of 1000° C. or more and less than a sintering temperature thereof to obtain a calcined powder; and pulverizing said calcined powder.

15. A process of making a zirconia based ceramic material as set forth in claim 9 further including a treatment prior to said molding and sintering steps, said treatment comprising the steps of:

heating said mixture at a temperature of 1000° C. or more and less than a sintering temperature thereof to obtain a calcined powder; and pulverizing said calcined powder.

16. A process of making a zirconia based ceramic material as set forth in claim 10 further including a treatment prior to said molding and sintering steps, said treatment comprising the steps of:

heating said mixture at a temperature of 1000° C. or more and less than a sintering temperature thereof to obtain a calcined powder; and pulverizing said calcined powder.

* * * * *

UNITED STATES PATENT AND TRADEMARK OFFICE
CERTIFICATE OF CORRECTION

PATENT NO. : 5,863,850
DATED : January 26, 1999
INVENTOR(S) : Masahiro Nawa, et al.

It is certified that error appears in the above-indentified patent and that said Letters Patent is hereby corrected as shown below:

On the title page,
Item [73] after "Matsushita Electric Works, Ltd., Osaka, Japan", please insert -- and Koichi NIIHARA, Osaka, Japan--.

Signed and Sealed this

Twelfth Day of October, 1999

Attest:

Q. TODD DICKINSON

*Attesting Officer*   Acting Commissioner of Patents and Trademarks